United States Patent [19]

Wilcock et al.

[11] 4,304,411

[45] Dec. 8, 1981

[54] MAGNETIC/CENTRIFUGAL-FLUID SEAL

[75] Inventors: Donald F. Wilcock, Schenectady; Martin W. Eusepi, Rexford, both of N.Y.

[73] Assignee: Mechanical Technology Incorporated, Latham, N.Y.

[21] Appl. No.: 140,969

[22] Filed: Apr. 17, 1980

[51] Int. Cl.³ .......................... F16J 15/42; F16J 15/16
[52] U.S. Cl. ........................................ 277/80; 277/13; 277/25; 277/135
[58] Field of Search .............. 277/80, 13, 14 R, 14 V, 277/25, 135; 308/36.3, 36.4

[56] References Cited

U.S. PATENT DOCUMENTS

| | | | |
|---|---|---|---|
| 2,874,982 | 2/1959 | Winther | 277/80 X |
| 2,996,162 | 8/1961 | Lehde | 277/80 X |
| 3,097,853 | 7/1963 | McHugh | 277/80 X |
| 3,254,745 | 6/1966 | Isakov et al. | 277/80 X |
| 3,612,549 | 10/1971 | Berkowitz | 277/80 |
| 3,620,584 | 11/1971 | Rosensweig | 277/80 X |
| 4,054,293 | 10/1977 | Hoeg et al. | 277/13 |
| 4,200,296 | 4/1980 | Stahl et al. | 277/80 |

FOREIGN PATENT DOCUMENTS

| | | | |
|---|---|---|---|
| 1187310 | 3/1959 | France | 277/14 |
| 54-108160 | 8/1979 | Japan | 277/80 |
| 494553 | 2/1976 | U.S.S.R. | 277/80 |

Primary Examiner—Robert S. Ward, Jr.
Attorney, Agent, or Firm—Joseph V. Claeys

[57] ABSTRACT

A magnetic/centrifugal-fluid seal comprising a rotating disk-like collar/vane surrounding a rotatable shaft journalled in a housing defined by close-fitting stationary members forming a cavity to accommodate the rotatable shaft and disk-like collar/vane. A magnetic fluid is retained in a close clearance magnetic gap region between the rotatable shaft and the stationary members and is magnetized by an external permanent magnet or electromagnet. At standstill or low-speed the magnetic fluid is retained by magnetic force in the close-clearance magnetic gap region formed by several sets of opposing pole-like teeth confronting the inner surfaces of the rotating disk-like collar/vane. By virtue of magnetic attraction the magnetic fluid can withstand a pressure drop between high and low pressure regions and thus effects a magnetic seal at standstill and low speeds. As the shaft rotates faster, the magnetic fluid is forced centrifugally from the magnetic seal region and becomes a rotating mass or pool of fluid at the circumferential rim of the disk-like collar/vane. The fluid then acts as a conventional centrifugal seal. When stopping or slowing down, a speed is reached where the magnetic/gravitational forces again dominate over the centrifugal forces and the magnetic fluid returns to the magnetic seal region.

16 Claims, 5 Drawing Figures

MAGNETIC/CENTRIFUGAL-FLUID SEAL

BACKGROUND OF INVENTION

1. Field of Invention

This invention relates to a combined magnetic/centrifugal-fluid seal for hermetically sealing a rotatable shaft supported in a closely-fitted housing in a non-contacting, non-wearing manner.

More particularly, the invention relates to a hermetic seal that comprises a combined magnetic seal employing a ferrofluid for hermetically sealing a rotatable shaft in the zero and low speed range and which utilizes the ferrofluid to form a centrifugal fluid seal at higher shaft speeds.

2. Background Problem

There are many applications, such as in pumps, compressors and the like, where hermetic sealing of a rotatable shaft in a non-contacting, non-wearing manner is not only desirable but essential during both zero and low speed operation and during high speed rotation. Because of the high speed sealing requirement for such applications, and in order to reduce wear, it is desirable that the seal be non-contacting in nature.

One well known form of non-contacting seal for use at zero and low speeds is the magnetic ferrofluid seals of the type described in U.S. Pat. No. 2,863,538—issued Dec. 9, 1958 for a "Permanent Magnet Seal"; U.S. Pat. No. 3,746,407—issued July 17, 1973 for a "Ferro Hydrodynamic Low Friction Bearing"; and an article entitled "Magnetic-Fluid Seal" appearing in Machine Design magazine, Mar. 28, 1968 issue, pages 145–150, for example. While known designs of ferrofluid seals can operate satisfactorily at zero speed and low speeds, as in a vacuum chamber feed-through, they tend to break down and leak at high rotational speeds.

A known form of non-contacting seal which can operate satisfactorily at high rotational speeds is the centrifugal seal of the type described in U.S. Pat. No. 3,694,042—issued Sept. 26, 1972 for a "Radial Fluid Bearing", for example. Such known centrifugal seals can support a large pressure difference based on the level difference of a pool of fluid formed on the two sides of a rotating disk attached to a shaft. The pool of fluid is both formed and maintained by centrifugal force effects. However, centrifugal seals have little capacity at low rotational speeds and collapse and leak at standstill.

In order to overcome certain of the above briefly-discussed problems in a non-contacting seal configuration, one proposed solution is described in U.S. Pat. No. 3,097,853—issued July 16, 1963 for "Dynamic Seal". This patent describes a seal configuration which employs an electrically conductive fluid in an otherwise conventional centrifugal seal together with an electromagnet for pumping the electrically conductive liquid during low speed and zero speed in order to maintain the hermetic sealing capabilities of the structure. The arrangement, however, has many disadvantages not the least of which is its relative complexity, power consumption at the zero or low speed regions and use of mercury as a sealing liquid.

SUMMARY OF THE INVENTION

It is therefore a primary object of the invention to provide a novel combined magnetic/centrifugal-fluid seal for hermetically sealing a rotatable shaft in a housing in a non-contacting, non-wearing manner.

Another object of the invention is to provide such a hermetic seal which is relatively simple in construction, cheap to operate and reliable in operation over a wide speed range from zero to a rotational speed in excess of 25,000 revolutions per minute (25,000 rpm) without rubbing contact.

In one manner of practicing the invention a rotatable shaft is fitted with an annular disk-like collar vane which in turn is surrounded by closely fitting stationary members comprising a part of the housing in which the shaft is journalled. A magnetically susceptible ferrofluid is inserted in a close clearance gap region between the stationary members and the annular disk-like collar/vane and is magnetized either by an external permanent magnet, or by an electromagnet, either selectively or continuously. At standstill or low-speed, the magnetically susceptible ferrofluid is retained by the magnetic circuit in the close clearance gap region between several sets of opposing teeth located in said region along the inner circumference of the rotating annular disk-like collar frame. By virtue of magnetic attraction, the ferrofluid can withstand a pressure drop between high and low pressure regions on opposite sides thereof and thus effect a seal. As the shaft (and disk-like collar/vane) rotate during high speed operation, the ferrofluid is forced centrifugally from between the teeth and becomes a rotating mass of fluid that forms a pool between the circumferential edge or rim of the disk-like collar/vane and the close-fitting stationary member. The pool of fluid then acts as a conventional centrifugal seal. While stopping or slowing down, a shaft speed is reached where the magnetic and gravitational forces again dominate over the centrifugal gravitational force and the ferrofluid returns to the close gap region between the opposed teeth thereby re-establishing the magnetic seal.

BRIEF DESCRIPTION OF THE DRAWINGS

These and other objects, features and many of the attendant advantages of the invention will be better understood upon a reading of the following detailed description when considered in connection with the accompanying drawings wherein like parts in each of the several figures are identified by the same reference number, and wherein.

DETAILED DESCRIPTION OF DRAWINGS

Figures 1, 1A:
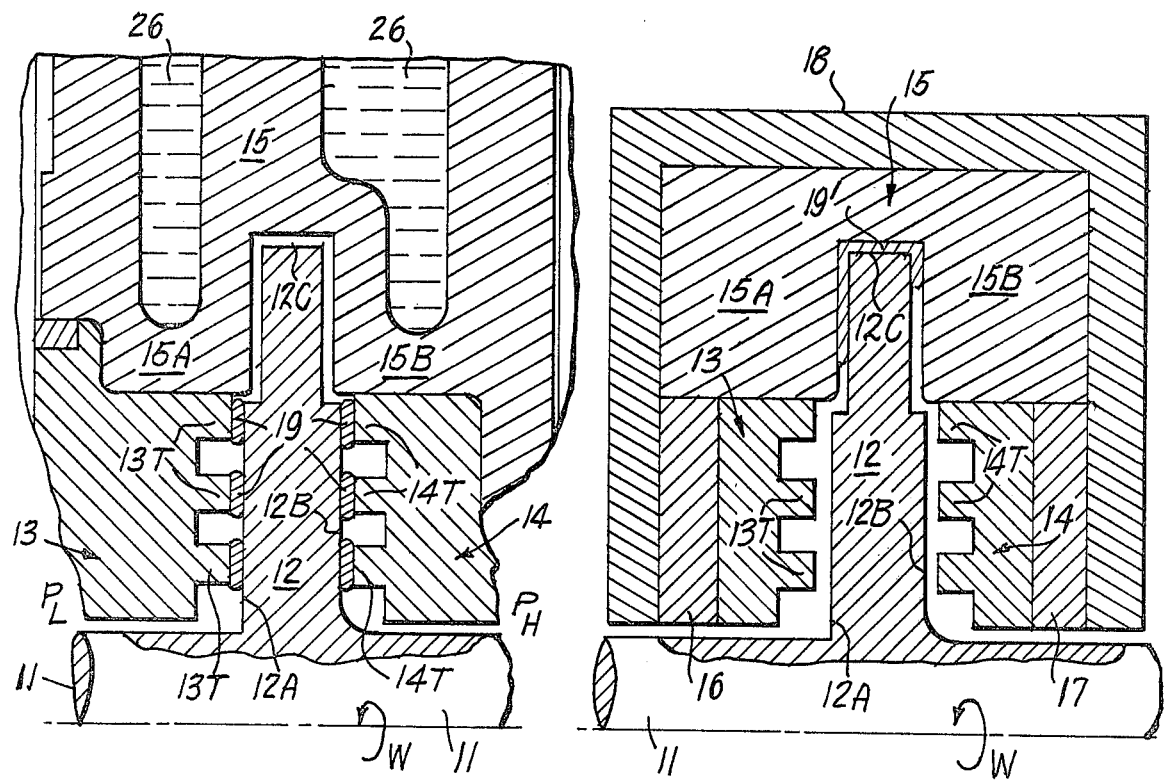
FIG. 1 is a partial sectional view of a novel combined magnetic/centrifugal-fluid seal constructed according to the invention, and in conjunction with FIG. 1A illustrates one of two different modes of operation for the seal, namely the magnetic seal operating mode.
FIG. 1A is a partial sectional view of a magnetic/centrifugal fluid seal according to the invention which employs a permanent magnet and illustrates the centrifugal seal mode of operation.

FIG. 1 is a partial sectional view of a preferred form of combined magnetic/centrifugal-fluid seal according to the invention. In FIG. 1 a rotatable shaft is shown at 11 which has an annular, disk-shaped collar/vane 12 press fit, brazed, welded or otherwise secured thereon so that the annular collar/vane 12 rotates in synchronism with the rotation of shaft 11. Rotatable shaft 11 is journalled in a bearing (not shown) that is supported on a housing having stationary members 13 and 14 comprising a part thereof or secured to the housing. The stationary members 13 and 14 are formed of magnetically susceptible material having high magnetic permeability, such as iron or steel. Members 13 and 14 abut an additional stationary member 15 having left and right side leg portions 15A and 15B made of a highly conductive (in a thermal sense) material such as copper or aluminum. The stationary members 13, 14 and 15 including side leg portions 15A and 15B are spaced apart from but closely fit the annular collar/vane 12 so as to define a close fitting cavity within which annular collar/vane 12 rotates during rotation of shaft 11. The inner edges of the stationary members 13 and 14 opposite the sides of annular collar 12 are serrated to form a plurality of annular magnetic pole-like teeth 13T and 14T, respectively, which are closely spaced apart from the opposing side surfaces 12A and 12B, respectively, of the annular collar/vane 12. The disk-like annular collar vane 12 is made of a highly permeable magnetic material and includes an outer vane-like portion whose outer peripheral edge or rim 12C is opposite the closely spaced surfaces of the central portion of stationary member 15 that defines the cavity in which collar/vane 12 rotates. The outer vane-like portion of collar/vane 12 may be formed from a non-magnetic material.

As best seen in FIG. 1A of the drawings, the stationary members 13 and 14 which define and form the magnetic pole pieces 13T and 14T, respectively, are designed to be connected in a closed magnetic circuit which may further include a set of annular permanent magnets 16 and 17 and an annular closure member 18 having a U-shaped cross section and also made of a magnetic material having a high magnetic permeability. Alternatively, the stationary pole piece members 13 and 14 may be connected in a closed magnetic circuit energized from an electromagnet as will be described more fully hereafter with respect to FIG. 2 of the drawings. For the purpose of the present description, it will be assumed that a magnetic field is established by either the permanent magnet arrangement of FIG. 1A or the electromagnet arrangement of FIG. 2. This magnetic field extends across the magnetic pole-like close clearance gap regions between the ends of the magnetic pole piece teeth 13T and 14T, respectively, to and through the opposing surfaces of the magnetically permeable inner annular portion of collar/vane 12. With the shaft 11 at rest or at low rotational speeds, a magnetically permeable ferrofluid shown at 19 will be attracted to and retained within the magnetic gap region defined by the opposed teeth 13T and 14T, respectively.

Ferrofluid 19 may comprise any known commercially available ferrofluid and is composed of a carrier liquid with a ferric suspension. However, other fluids such as hydrocarbons may also be used. The important considerations with respect to the ferrofluid are its saturation magnetization and its viscosity. The stronger the saturation magnetization characteristics of the ferrofluid are, then the greater the pressure drop that can be accommodated by a magnetic seal formed with the ferrofluid. The viscosity of the ferrofluid should be as low as practical so as to minimize viscous power loss during high speed rotation of shaft 11. A typical ferrofluid suitable for use in the present seal was measured to have a saturation magnetization of 250–300 gauss and a viscosity of 0.06–0.10 pa-second (60–100 cps) at room temperature (magnetized) and a measured density of 996.5 k/M$^3$ (0.036 lbs/inch$^3$). The other important property of the ferrofluid is the requirement that it be immiscible with regard to the fluids being sealed in or out relative to a low pressure region assumed to be $P_L$ in FIG. 1 and a high pressure region assumed to be $P_H$.

During operation, at standstill or low rotational speeds of shaft 11, the magnetic fluid 19 is retained by the magnetic circuit within the close clearance magnetic gap region defined by the pole teeth 13T and 14T so as to form a multiple stage magnetic seal between the low pressure region $P_L$ and the high pressure region $P_H$. The pressure drop between these two regions is withstood by virtue of the magnetic attraction of the ferrofluid to the pole pieces thereby effecting a seal. As the shaft rotational speed increases, the fluid is forced outwardly by centrifugal force from the close clearance magnetic gap region and thrown outwardly by action of the exterior vane portion 12C of collar vane 12 into a centrifugal seal forming region. The centrifugal seal region is disposed radially outwardly from the magnetic gap region and is located between the outer circumferential edge or rim portion 12C of collar/vane 12 and the opposed surfaces of the stationary members 15, 15A and 15B as shown by reference numeral 19' in FIG. 1A. As a result of the centrifugal force effect, the fluid from all of the stages of the magnetic seal gap region is effectively pooled in the centrifugal seal region as shown in 19' to thereby form a centrifugal hermetic seal between the rotatable member 12 and the stationary member 15 which effectively isolates the low pressure region $P_L$ from the high pressure region $P_H$. It should be expressly noted at this point in the description that the two seals do not exist co-extensively. At standstill or at low rotational speeds the magnetic fluid is in the magnetic gap region as shown at 19 forming the multiple stage magnetic seal. At higher rotational speeds in the neighborhood of 11,000 rpm or higher, the fluid is moved outwardly through centrifugal force effects to form the centrifugal seal shown at 19'. The transition between the two sealing regions is substantially abrupt in nature in going from slow speed to high speed operation or in the reverse going from high speed operation to slow rotational speed and standstill with little or no leakage taking place during the transition phase.

In designing a combined magnetic/centrifugal-fluid seal according to the invention, a small clearance between moving and stationary parts is desirable in order to optimize magnetic sealing characteristics of the magnetic operating mode of the seal. The magnitude of the clearances, however, depends upon other factors which include shaft run out, radial strain due to centrifugal and thermal growth, and compatible fluid volume for both the magnetic and centrifugal modes of operation. The circumferentially arranged centrifugal seal forming region of the structure is designed to contain the magnetic fluid transported from the magnetic gap sealing region during high speed operation. The height (depth)

magnetically susceptible ferrofluid 19 normally is disposed in the close clearance magnetic gap region between the ends of the pole teeth 13T and 14T and the opposing surfaces of the shaft portion 31 to thereby form a multiple stage magnetic seal between a low pressure region on the lefthand side of the structure and a high pressure region on the righthand side of the structure. During the magnetic sealing mode of operation, the electromagnetic coil 21 will be energized from a suitable energizing circuit such as that described with relation to FIG. 2. It is optional whether a coolant will be supplied through the cooling vanes 15 during the magnetic sealing mode of operation. Thereafter, as the shaft 31 speeds up, the magnetic fluid is thrown through centrifugal action into the centrifugal seal region intermediate the circumferential edge or rim of the annular collar/vane 32 and the non-magnetic stationary member 15 to form a centrifugal seal indicated at 19'. Again, as in the previous embodiment, the magnetic seal and the centrifugal seal do not coexist but are present only during either the standstill or low speed operating period or the high speed operating period, respectively. In the same manner as the FIG. 2 arrangement, during the high speed rotation of shaft 31 the electromagnet 21 can be de-energized to reduce losses introduced into the system. In both types of seal structures shown in FIG. 1 and FIG. 3, upon shaft 11 or 31 slowing below the transition speed, the ferrofluid returns to the close clearance gaps between the magnetic teeth and does not remain in the intervening spaces.

Figure 3:
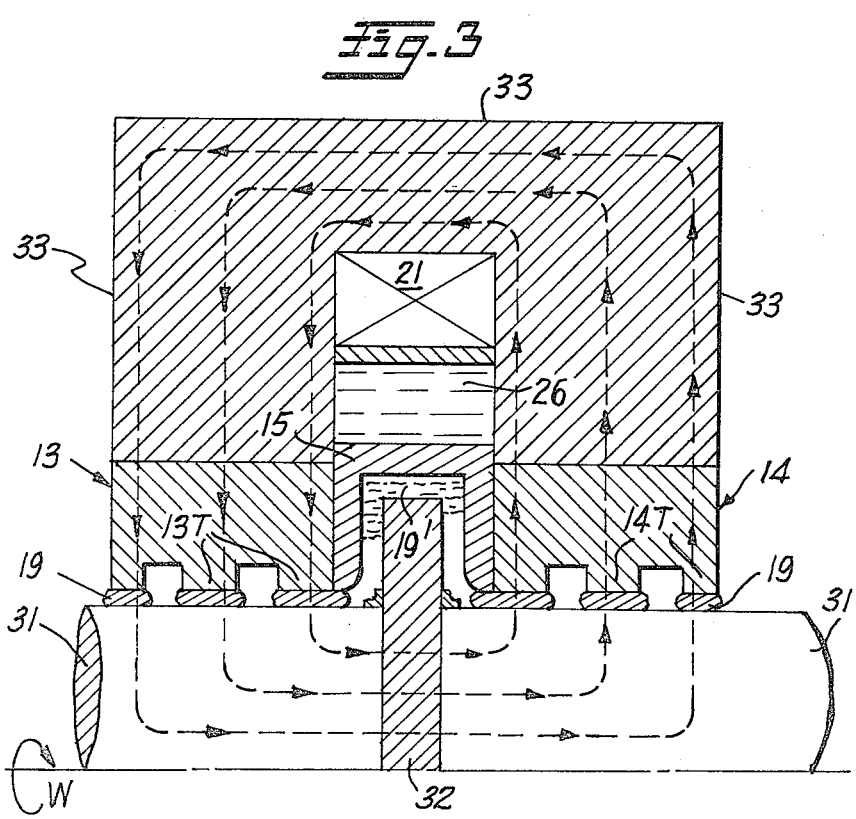
FIG. 3 is a partial sectional view of still another form of combined magnetic/centrifugal fluid seal according to the invention wherein the close gap magnetic sealing regions are arrayed axially as opposed to the radial arrangement illustrated in FIGS. 1 and 2.
Figure 4:
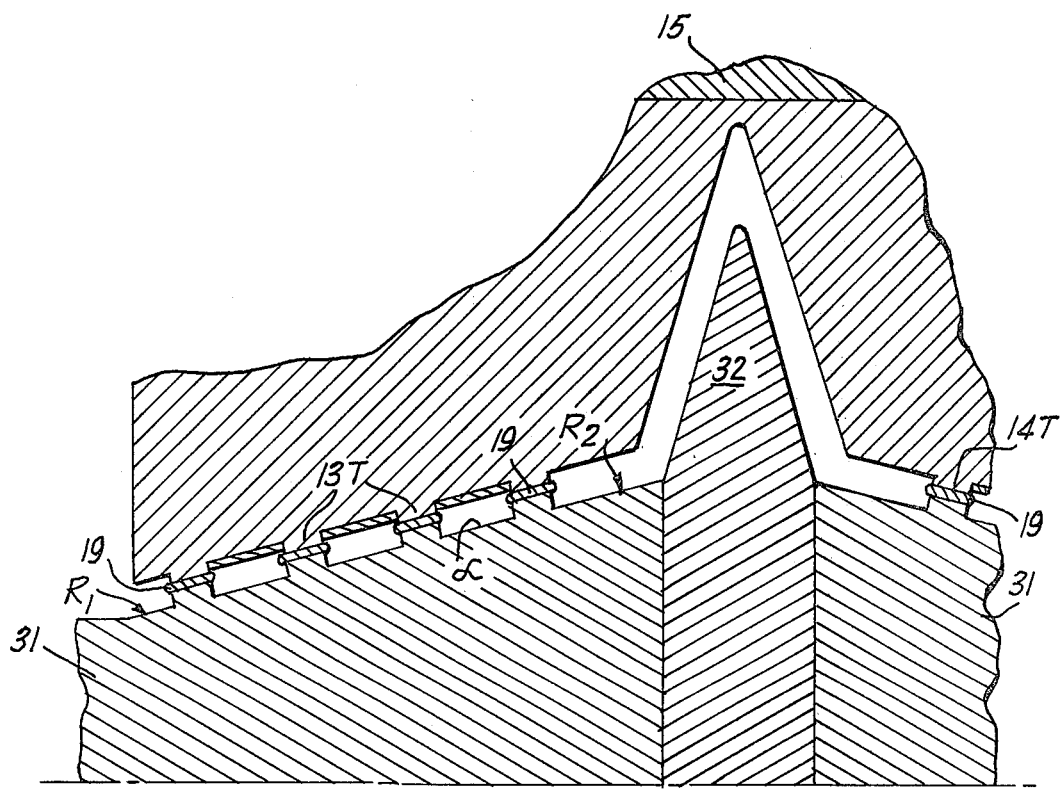
FIG. 4 is a partial sectional view of a modified form of an axially arrayed combined magnetic/centrifugal-fluid seal which employs a tapered shaft to facilitate operation during transition from magnetic to centrifugal sealing mode and vice versa.

FIG. 4 is a partial sectional view of a modified and preferred form of an axially arrayed, magnetic/centrifugal seal such as that shown in FIG. 3. In the FIG. 4 embodiment of the invention, shaft 31 is tapered in the region immediately adjacent the collar/vane 32 so that portions of shaft 32 engaging annular collar/vane 32 have a greater diameter than the portions of the shaft 31 further away from collar/vane 32. The angle alpha ($\alpha$) of this tapered portion relative to the center axis of shaft 31 and provided by the increased diameter segments of shaft 31, should have a minimum value determined by the expression $$\Delta p = \rho \omega_F^2 (R_2^2 - R_1^2) \quad (3)$$

where $\omega_F$ is the speed or rate at which the ferrofluid in the magnetic seal region empties during transition from magnetic sealing to centrifugal sealing and $\Delta p$ is the pressure limit of a magnetic seal section having N teeth. Again, $\rho$ is the density of the fluid, $R_2$ is the radius of the shaft 11 at the point thereof immediately joining annular collar/vane 32, and $R_1$ is the radius of the shaft at the point along the axis of shaft 31 furtherest from collar/vane 32 but still within the magnetic seal region.

Another difference in construction of the embodiment of the invention shown in FIG. 4 is the use of non-magnetic filler material in the space between the magnetic pole piece teeth 13T and 14T to facilitate flow of the ferrofluid during transition from magnetic sealing at low speeds to centrifugal sealing at high speeds and vice versa. Such non-magnetic material also could be placed in the spaces between corresponding teeth formed on the shaft 31 as shown in FIG. 4 in structures where such teeth are provided on the shaft to oppose the magnetic pole piece teeth 13T and 14T on pole pieces 13 and 14, respectively.

In operation, the embodiment of the invention shown in FIG. 4 functions in much the same manner as that of FIG. 3 with the additional feature of improved flow characteristics for the ferrofluid from the magnetic seal region to the centrifugal seal region, and vice versa during transitional phases by reason of the taper provided to shaft 31 in the parts adjoining annular collar/vane 32.

From the foregoing description, it will be appreciated that the invention makes available a novel, combined magnetic/centrifugal-fluid seal for hermetically sealing a rotatable shaft in a housing in a non-contacting, non-wearing manner. The hermetic seal thus provided is relatively simple in construction, cheap to operate and reliable in operation over a wide range of rotational speeds from zero to in excess of 25,000 revolutions per minute. Since the seal is non-contacting, there is no rubbing of parts and hence no wear even at high rotational speeds for extended periods of time.

Having described several embodiments of a new and improved magnetic/centrifugal-fluid seal constructed according to the invention, it is believed that other modifications, variations and changes will be suggested to those skilled in the art in the light of the above teachings. It is therefore to be understood that all such variations, modifications and changes are believed to come within the scope of the invention as defined by the appended claims.

What is claimed is:

1. A magnetic/centrifugal-fluid seal for hermetically sealing the space between a rotating member and a close fitting spaced-apart stationary member comprising means formed on said members defining at least one magnetic pole-like close clearance gap region between opposed surfaces of the members, a magnetically permeable fluid normally disposed in said magnetic gap region with said rotating member at rest or rotating at slow rotational speeds, an electromagnet magnetic field producing means magnetically coupled to at least portions of said rotating and stationary members, said magnetic gap region and said magnetically permeable fluid in a closed magnetic circuit, said electromagnet being capable of producing a sufficiently strong magnetic field to drive the magnetically permeable fluid into a saturation magnetization condition, on/off electric switch means for turning the electromagnet on while the rotatable member is at rest and during slow speed operation thereof and for turning the electromagnet off during high speed rotation of the rotatable member, and a circumferentially arranged centrifugal seal forming region radially disposed outwardly from said magnetic gap region and located between the rotating and stationary members for receiving and pooling fluid centrifugally thrown there during high speed rotation of said rotating member to thereby form a centrifugal hermetic seal through the medium of the fluid pooled between the two members by centrifugal force.

2. A magnetic/centrifugal-fluid seal according to claim 1 wherein there are a plurality of magnetic pole-like close clearance gap regions formed between the opposed surfaces of the rotating and stationary members to thereby form a multiple stage magnetic seal while said rotating member is at rest and during slow speed rotation thereof.

3. A magnetic/centrifugal-fluid seal according to claim 1 wherein the magnetically permeable fluid comprises a ferrofluid formed by a ferric suspension in a suitable carrier liquid having low viscosity and strong saturation magnetization characteristics with the ferroof the resulting centrifugal seal and the diameter of the outer vane portion of the disk-like collar vane 12, depend upon volume ratio considerations. Since the magnetic seal must be designed to hold a certain amount of fluid, the centrifugal seal stage must be designed to accommodate the same amount of fluid and still maintain minimum allowed clearance.

For practical applications of the magnetic/centrifugal-fluid seal, permanent magnets generally would be used as shown in FIG. 1A, or in other comparable configurations employing permanent magnets. Theoretically, the magnetic seal strength during the magnetic seal operating mode, is proportional to the magnetic field intensity. Consequently, the strongest permanent magnet available should be employed in such applications. Rare earth-cobalt or Samarium-cobalt materials provide the strongest manmade permanent magnets with residual flux densities of the order of 7,300 to 8,500 gauss. However, for other applications, it may prove more desirable to employ an electromagnet for the magnetic seal mode as will be described more fully hereinafter with respect to FIG. 2.

Theoretically, the seal strength or capacity, $\Delta P$, of a single magnetic seal stage is proportional to the magnetic field intensity as follows:

$$\Delta P = (M_s)(H)(10^{-6})/4 \text{ atmospheres} \quad (1)$$

where $M_s$ is the magnetization saturation of the magnetic field in gauss, and $H$ is the gap magnetic field intensity measured in Oersteds when the magnetic-fluid is magnetized to saturation. Using equation (1) and based on actual measured flux density in a single magnetic seal stage, it was determined that the sealing capacity of a single magnetic seal stage was approximately $2.8 \times 10^4$ PA (4.0 psi). Assuming the flux density passing through all of the stages (labyrinths) to be uniform, the net sealing capacity of seal as shown in FIG. 1 during the magnetic seal mode was calculated to be $16.5 \times 10^4$ PA (24 psi). Using these figures, additional computations were made to establish that the transition speed at which centrifugal loading would overcome the $2.8 \times 10^4$ PA (4.0 psi) magnetic sealing capability. The calculated rotating speed for transition from a magnetic to centrifugal seal mode occurred at 10,428 rpm.

The sealing capacity during the centrifugal seal mode has been calculated using the equation:

$$\Delta P = \frac{\rho \omega^2}{8}(r_o^2 - r_i^2) \quad (2)$$

where $r_o$ is the fluid level on the low pressure side, $r_1$ is the fluid level on the high pressure side, $\rho$ is the density of the fluid and $\omega$ is the shaft speed.

Figure 2:
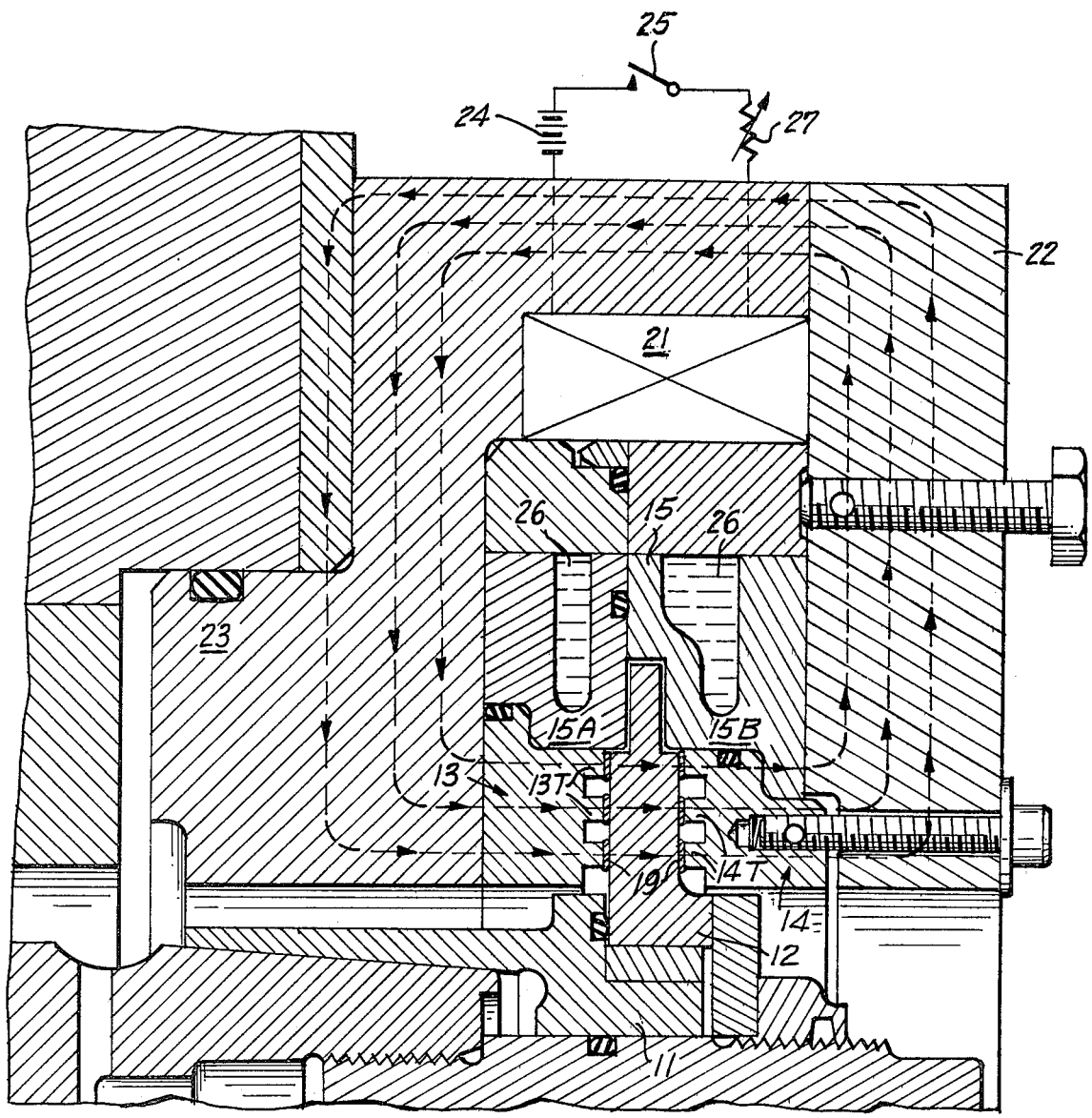
FIG. 2 is a partial sectional view of a novel seal illustrating a rotatable shaft supported in a housing and employing a novel magnetic/centrifugal-fluid seal according to the invention which uses an electromagnet.

FIG. 2 of the drawings is a cross-sectional view of a magnetic/centrifugal fluid seal according to the invention which employs an electromagnetic field producing coil 21 for producing a desired strength magnetic field across the magnetic gap seal region between the pole teeth of magnetic pole pieces 13 and 14 and the magnetically susceptible portion of collar 12. The pole pieces 13 and 14 are connected in a closed magnetic circuit with soft iron or other magnetically susceptible members 22 and 23 which surround the electromagnetic field producing coil 21 so as to produce a closed magnetic circuit indicated by the dashed magnetic flux arrows. The electromagnetic coil 21 is connected in an electrical circuit relationship with a source of electric current indicated as a battery 24 through a suitable on-off switch 25 and a variable resistor 26 for controlling the strength of the magnetic field produced by electromagnet 21.

FIG. 2 also discloses more completely the construction of the cooling coil comprised by the stationary members 15, 15A and 15B which may be formed of copper, aluminum or other non-magnetic material and through which cooling liquid such as water indicated at 26 is circulated during high speed rotation of the shaft 11.

The magnetic/centrifugal seal construction of FIG. 2 operates identically to the arrangement shown in FIG. 1 except that during high speed operation of the shaft 11, the electromagnet 21 can be de-energized by opening switch 25 so as to facilitate transition from the magnetic sealing mode to the centrifugal sealing mode as well as to reduce losses otherwise induced by magnetic resistance during high speed rotation. Additionally, the flow of cooling fluid such as water 26 through the cooling coils 15, 15A and 15B maintains the temperature of the sealing fluid during the centrifugal sealing mode within prescribed limits so as to avoid buildup of high temperatures that might otherwise adversely affect the ferrofluid characteristics or induce unwanted thermal expansion of parts, etc.

FIG. 3 is a cross-sectional view of still another embodiment of the invention wherein a rotatable shaft 31, or at least that portion of the shaft where the magnetic/centrifugal seal is to be mounted, is formed from a magnetically permeable material such as stainless steel, iron, etc. The magnetic pole pieces 13 and 14 are disposed on opposite sides of a non-magnetic stationary member 15 again formed from non-magnetic materials such as copper and having the side portions 15A and 15B separating the magnetic pole pieces 13 and 14. The magnetic pole-like teeth 13T on pole piece 13 and 14T on pole piece 14 are serially arrayed in concentric rings axially disposed along the length of shaft 31 in the manner shown in FIG. 3. The pole-like teeth 13T and 14T may be of equal breadth but alternatively may be staggered in breadth with the widest teeth being located adjacent vane 32 and the teeth spaced further along the axis of shaft 31 from vane 32 being gradually decreased in breadth. A ferrofluid 19 is disposed in the close-clearance magnetic gap regions formed between the ends of the pole-like teeth 13T and 14T and opposing surface of the magnetically permeable shaft portion 31. A collar/vane 32 formed of non-magnetic material is secured to shaft 31 so as to rotate in a close fitting annular cavity surrounding shaft 31 and collar/vane 32 and defined by the non-magnetic stationary members 15, 15A and 15B. An annular magnetically permeable stationary member 33 having a U-shaped cross section is secured with its circumferential inturned legs abutting the upper surfaces of the magnetic pole pieces 13 and 14 so that a closed magnetic circuit is formed via the member 33, pole piece 13, shaft portion 31 and pole piece 14 as indicated by the magnetic lines of flux arrows that thread this closed path. An electromagnetic field producing coil 21 is disposed in the space between the legs of the U-shaped stationary member 33 and a suitable coolant is supplied through the space 26 adjacent non-magnetic member 15 for cooling the centrifugal seal region of the structure.

In the magnetic/centrifugal seal structure shown in FIG. 3, at standstill and during low speed rotation, the fluid thus comprised being immiscible with respect to other fluids being sealed.

4. A magnetic/centrifugal-fluid seal according to claim 1 further including means for controlling the magnitude of the energization current supplied to the electromagnet.

5. A magnetic/centrifugal-fluid seal according to claim 1 further including means for cooling the circumferentially arranged centrifugal seal forming region of said seal at least during high speed rotation of said rotatable member.

6. A magnetic/centrifugal-fluid seal according to claim 2 wherein said plurality of stages of magnetic seals are formed by a plurality of sets of teeth formed on at least one of the opposed surfaces of said rotating and stationary members.

7. A magnetic/centrifugal-fluid seal according to claim 6 wherein the magnetically permeable fluid comprises a ferrofluid formed by a ferric suspension in a suitable carrier liquid having low viscosity and strong saturation magnetization characteristics with the ferrofluid thus comprised being immiscible with respect to other fluids being sealed and further including means for cooling the circumferentially arranged centrifugal seal forming region of said seal at least during high speed rotation of said rotatable member.

8. A magnetic/centrifugal-fluid seal according to claim 7 further including means for controlling the magnitude of the energization current supplied to the electromagnet.

9. A magnetic/centrifugal-fluid seal for hermetically sealing the space between a rotatable shaft and a close fitting spaced-apart stationary housing, said rotatable shaft having a circular cross section and journalled in said housing, said rotatable shaft being fabricated from magnetically permeable material at least in the region of the seal and having an annular collar vane secured thereto and rotatable therewith, said rotatable shaft being tapered along its axial length in the area of the seal with the largest diameter portion of the shaft being surrounded by the annular collar vane, said housing having an annular cavity formed therein surrounding the collar vane to define a circumferentially arranged centrifugal seal forming region in the space between the inside radial end of the cavity and the outer circumferential edge of the annular collar vane, at least one magnetic pole-like close clearance gap region formed between opposed surfaces of said rotatable shaft and a magnetically permeable portion of the housing in the vicinity of the seal, said gap region communicating with the annular cavity surrounding the collar vane, a magnetically permeable fluid normally disposed in said magnetic gap region with said rotatable shaft at rest or at slow rotational speeds, and magnetic field producing means magnetically coupled to at least portions of said rotating shaft, said magnetic gap region, the magnetic susceptible portions of said housing and said magnetically permeable fluid in a closed magnetic circuit, said circumferentially arranged centrifugal seal forming region being disposed radially outwardly from said magnetic gap region for receiving and pooling fluid centrifugally thrown there during high speed rotation of said rotatable shaft to form a centrifugal hermetic seal through the medium of the fluid pooled between the two members by centrifugal force and the magnetically permeable fluid disposed in the magnetic gap region forming a hermetic magnetic seal during slow rotation or the at rest conditions of the rotatable shaft.

10. A magnetic/centrifugal-fluid seal according to claim 9 wherein there are a plurality of magnetic pole-like close clearance gap regions formed by a plurality of sets of magnetic pole-like teeth formed on at least one of the opposed surfaces of said rotatable shaft and said housing and which comprise a multiple stage magnetic seal while said rotatable shaft is at rest and during slow speed rotation thereof.

11. A magnetic/centrifugal-fluid seal according to claim 10 wherein a plurality of magnetic pole-like close clearance gap regions are formed on each side of the annular collar vane along the axial extent of the rotatable shaft to thereby produce multiple stage magnetic seals on either side of the centrifugal seal region.

12. A magnetic/centrifugal-fluid seal according to claim 11 wherein said rotatable shaft is tapered along its axial length in both directions from the larger diameter portion surrounded by the annular collar vane.

13. A magnetic/centrifugal-fluid seal according to claim 12 wherein the magnetically permeable fluid comprises a ferrofluid formed by a ferric suspension in a suitable carrier liquid having low viscosity and strong saturation magnetization characteristics with the ferrofluid thus comprised being immiscible with respect to other fluids being sealed.

14. A magnetic/centrifugal-fluid seal according to claim 12 further including means for cooling the circumferentially arranged centrifugal seal forming region of said seal during high speed rotation of said rotatable member.

15. A magnetic/centrifugal-fluid seal according to claim 12 wherein the magnetic field producing means comprises a permanent magnet capable of producing a sufficiently strong magnetic field to drive the magnetic permeable fluid into a saturation magnetization condition.

16. A magnetic/centrifugal-fluid seal according to claim 12 wherein said magnetic field producing means comprises an electromagnet capable of producing a sufficiently strong magnetic field to drive the magnetically permeable fluid into a saturation magnetization condition and an electrical on/off switch means for turning the electromagnet on while the rotatable member is at rest and during slow speed operation and for turning the electromagnet off during high speed rotation of the rotatable member.

* * * * *